(12) United States Patent
Chang

(10) Patent No.: US 7,443,927 B2
(45) Date of Patent: Oct. 28, 2008

(54) SIGNAL DETECTOR

(75) Inventor: Yi-Yang Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/761,439

(22) Filed: Jun. 12, 2007

(65) Prior Publication Data

US 2007/0230629 A1 Oct. 4, 2007

Related U.S. Application Data

(63) Continuation-in-part of application No. 10/799,896, filed on Mar. 15, 2004, now abandoned.

(51) Int. Cl.
*H04L 27/00* (2006.01)
*H04L 27/06* (2006.01)
*H04L 23/00* (2006.01)

(52) U.S. Cl. .................... 375/316; 375/340; 375/377

(58) Field of Classification Search ............... 375/316, 375/340, 257, 377
See application file for complete search history.

(56) References Cited

U.S. PATENT DOCUMENTS 4,173,756 A 11/1979 Kawagai et al.
5,553,623 A * 9/1996 Ochs ..................... 600/523
5,903,560 A 5/1999 Samejima et al.

* cited by examiner

*Primary Examiner*—Tesfaldet Bocure
(74) *Attorney, Agent, or Firm*—Thomas, Kayden, Horstemeyer & Risley

(57) ABSTRACT

A signal detector comprises a signal translator, a data signal detector, a clock signal detector and an inputting control circuit for detecting abnormal clock and data signals. The signal translator respectively converts differential data signals and differential clock signal into a single data signal and a single clock signal. The data signal detector outputs a data detecting signal according to the single data signal. The clock signal detector outputs a clock detecting signal according to the single clock signal. The interrupting control circuit receives the data detecting signal and outputs a shutdown signal when the single data signal is at high voltage level over a predefined ratio. The interrupting control circuit also receives the clock detecting signal and outputs the shutdown signal when the single clock signal abnormally disappears.

17 Claims, 5 Drawing Sheets

SIGNAL DETECTOR

CROSS REFERENCE TO RELATED APPLICATIONS

This application is a Continuation-In-Part of pending U.S. patent application Ser. No. 10/799,896, filed Mar. 15, 2004 and entitled "Signal Detector".

BACKGROUND OF THE INVENTION

1. Field of the Invention

The invention relates to a signal detector, and in particular relates to a clock and data signal detector.

2. Description of the Related Art

There are numerous types of detectors in the market for various uses, such as fire warning, anti-theft, quantity surveying and so on . . . Basically, these detection devices detect temperature, pressure or light and send out a signal for warning.

However, currently, no transmission facilities are equipped with a signal detection function. Therefore, once the clock signal is interrupted during a transmission, the whole course of transmission is interrupted as well without any warning. Such interruptions often cause delays in time and transmission, and in turn waste valuable resources. Also, during data transmission, if a short circuit or other factors cause the system to continuously output a series of data signals, the abnormal data transmission may cause the transmission facility as well as the laser to become overly exhausted or even break down.

BRIEF SUMMARY OF THE INVENTION

A detailed description is given in the following embodiments with reference to the accompanying drawings.

An embodiment of a signal detector is provided. The signal detector comprises a signal translator, a data signal detector and an inputting control circuit. The signal translator converts differential data signals into a single data signal. The data signal detector outputs a data detecting signal according to the single data signal. The interrupting control circuit receives the data detecting signal and outputs a shutdown signal when the single data signal is at high voltage level over a predefined ratio.

Another embodiment of a signal detector is provided. The signal detector comprises a signal translator, a data signal detector, a clock signal detector and an inputting control circuit. The signal translator respectively converts differential data signals and differential clock signal into a single data signal and a single clock signal. The data signal detector outputs a data detecting signal according to the single data signal. The clock signal detector outputs a clock detecting signal according to the single clock signal. The interrupting control circuit receives the data detecting signal and outputs a shutdown signal when the single data signal is at high voltage level over a predefined ratio. And the interrupting control circuit receives the clock detecting signal and outputs the shutdown signal when the single clock signal abnormally disappears.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
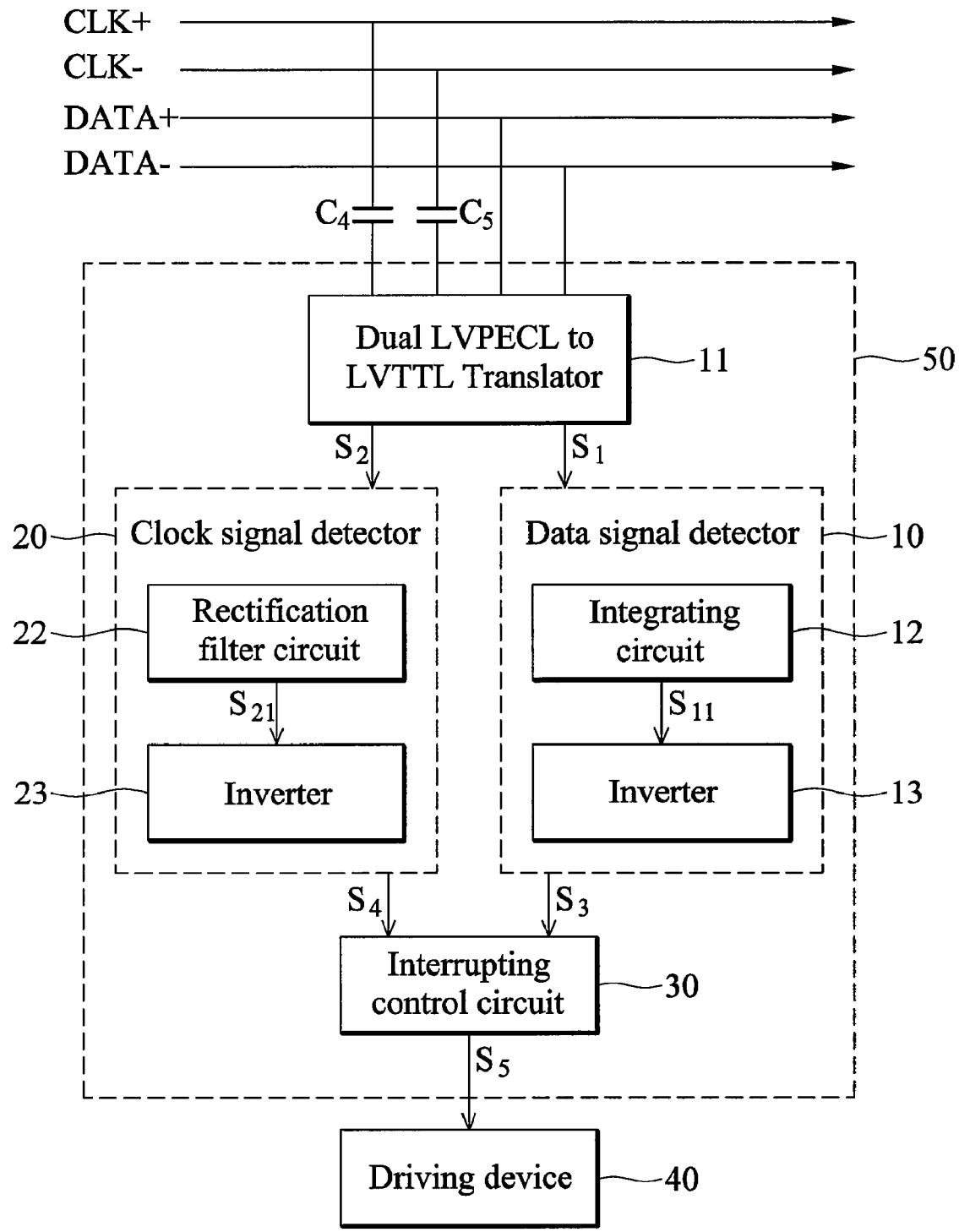
FIG. 1 is a block diagram of a signal detector and a driving device according to an embodiment of the invention.

FIG. 1 is a block diagram of signal detector 50 and driving device 40 according to an embodiment of the invention. Signal detector 50 comprises dual LVPECL to LVTTL translator 11, data signal detector 10, clock signal detector 20 and interrupting control circuit 30. Differential data signals DATA+ and DATA− are inputted to translator 11. Differential clock signals CLK+ and CLK− through capacitors $C_4$ and $C_5$ are inputted to signal translator 11. Signal translator 11 converts differential data signals DATA+ and DATA− into single data signal $S_1$. Data signal detector 10 comprises integrating circuit 12 and inverter 13 and detects single data signal $S_1$ to output data detecting signal S3. According to one embodiment, if single data signal $S_1$ is at high voltage level over the predefined ratio, data detecting signal $S_3$ is at low voltage level. Interrupting control circuit 30 receives low voltage level data detecting signal $S_3$ and outputs shutdown signal $S_5$ to stop driving device 40 operations.

Signal translator 11 also converts differential clock signals CLK+ and CLK− into single clock signal $S_2$. Clock signal detector 20 comprises rectification filter circuit 22 and inverter 23 and detects single clock signal $S_2$ to output clock detecting signal $S_4$. According to another embodiment, if the single clock signal $S_2$ is abnormal, at low voltage level for a long period of time or disappears (abnormal state 301), clock detecting signal $S_4$ is at high voltage level. Interrupting control circuit 30 receives high voltage level data detecting signal $S_4$ and outputs shutdown signal $S_5$. If driving device 40 receives shutdown signal $S_5$, driving device 40 stops to drive laser transmitter (not shown in FIG. 1) which emits laser signals in optical fibers for data transmission.

Figure 2:
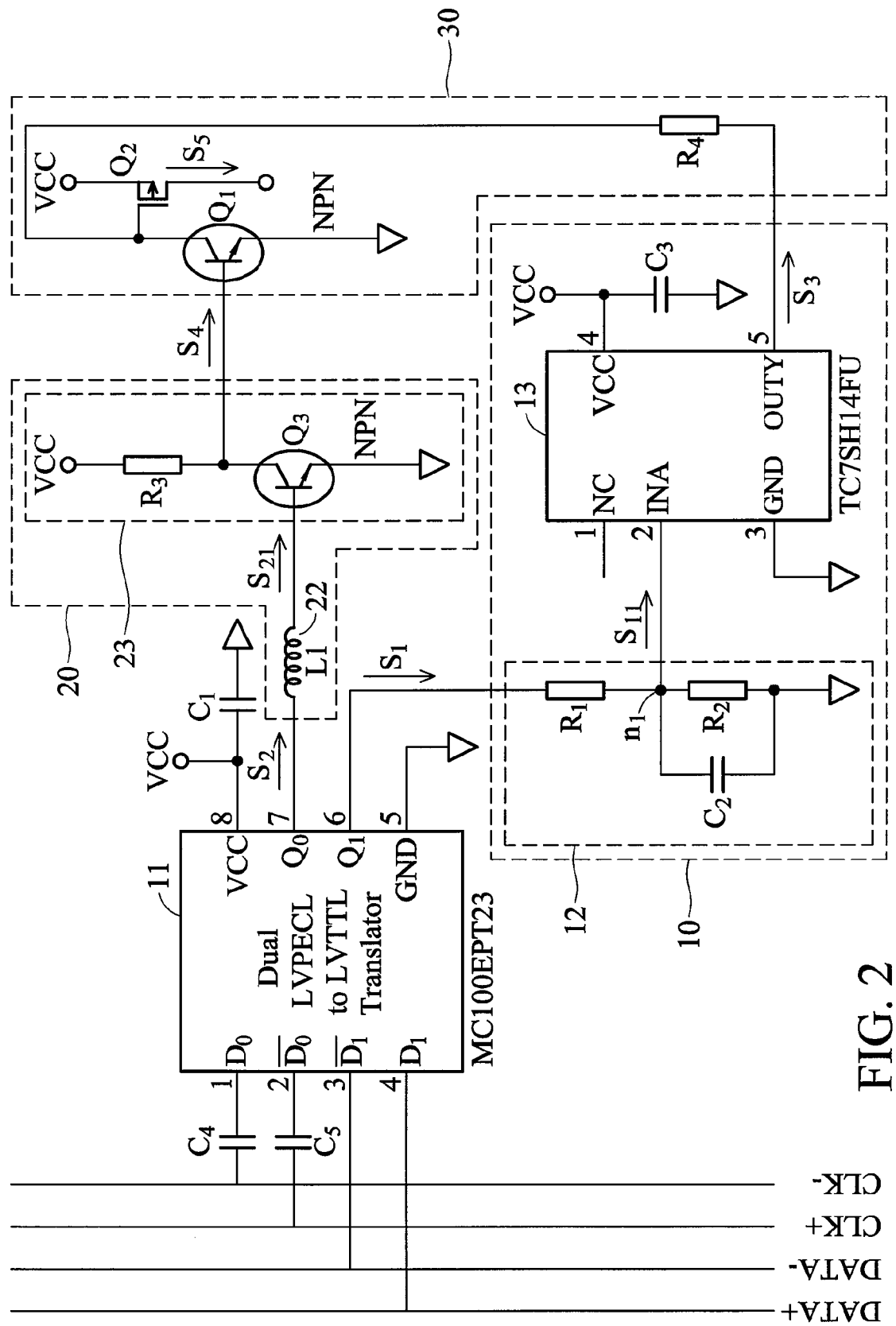
FIG. 2 is a detail diagram of a signal detector according to another embodiment of the invention.

FIG. 2 is a detailed diagram of signal detector 50 according to another embodiment of the invention. Dual LVPECL to LVTTL translator 11 can be the MC100EPT23 chip. Dual LVPECL to LVTTL translator 11 converts differential signals into a single signal. Interrupting control circuit 30 comprises NPN BJT (Bipolar Junction Transistor) $Q_1$ and PMOS (Positive-channel Metal Oxide Semiconductor) transistor $Q_2$. NPN BJT transistor $Q_3$ comprises a base receiving clock detecting signal $S_4$, a collector coupled to ground and an emitter coupled to PMOS transistor $Q_1$. PMOS transistor $Q_2$ comprises a gate coupled to the emitter of NPN BJT transistor $Q_3$ and first inverter 13, a source coupled to voltage VCC and a drain outputting the shutdown signal according to the voltage level of the gate of PMOS transistor $Q_2$.

Figure 4:
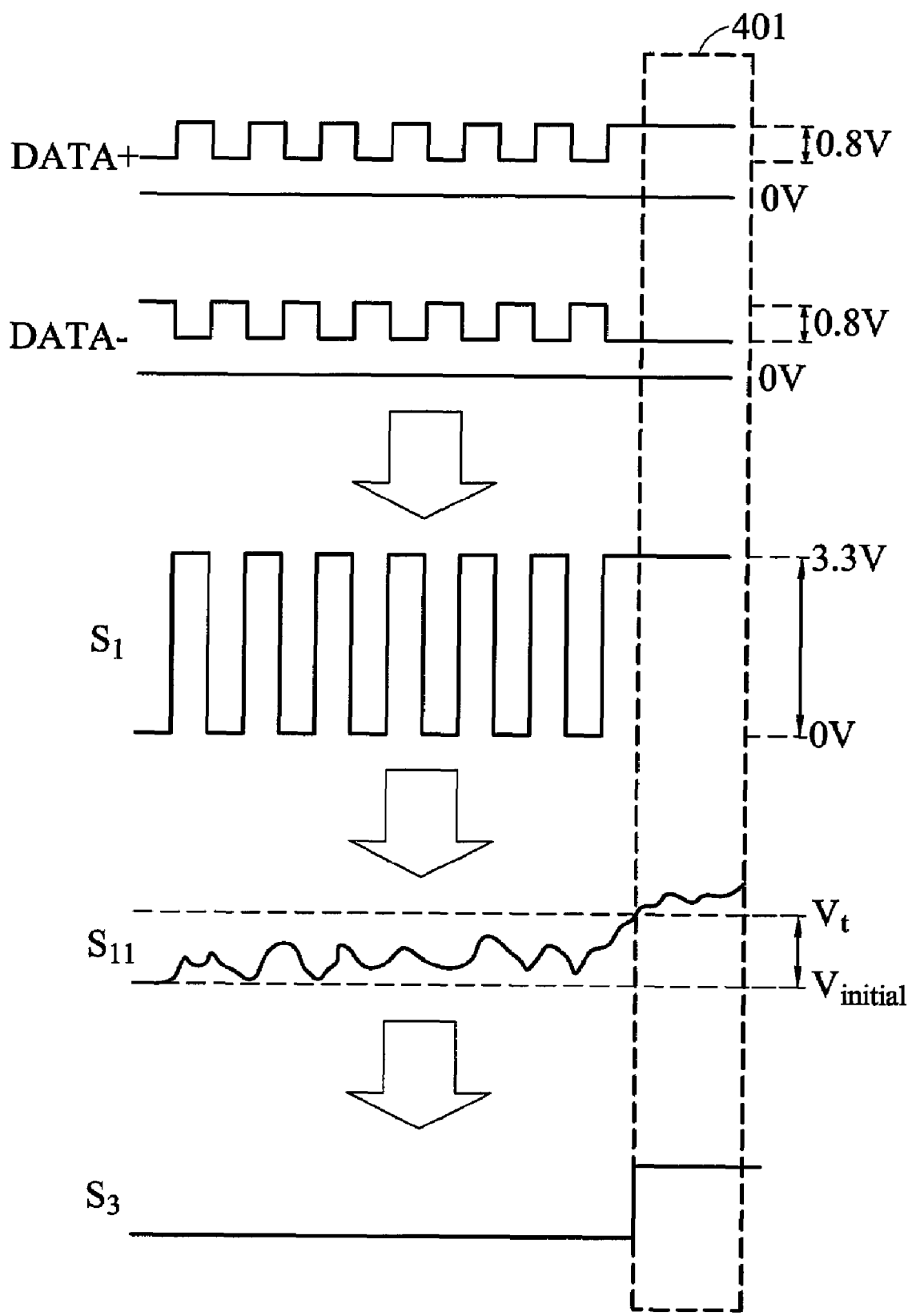
FIG. 4 is a signal diagram of a data signal detector according to another embodiment of the invention.

Integrating circuit 12 comprises resistors $R_1$ and $R_2$ and capacitor $C_1$. Resistor $R_1$ is coupled between LVPECL to LVTTL translator 11 and node n1. Capacitor $C_1$ and resistor $R_2$ are coupled between ground and node n1. Integrating circuit 12 converts single data signal $S_1$ into integrating signal $S_{11}$. If the single data signal $S_1$ (abnormal state) is at high voltage level over the predefined ratio or over the predefined period, integrating signal $S_{11}$ is higher than a threshold voltage. Inverter 13 receives integrating signal $S_{11}$ which is higher than the threshold voltage and inverts integrating signal $S_{11}$ to output a low voltage level data detecting signal $S_3$, as shown in FIG. 4. Inverter 13 can be the TC7SH14FU chip or an equivalent NOT gate. When interrupting control circuit 30 receives low voltage level data detecting signal $S_3$, interrupting control circuit 30 outputs shutdown signal $S_5$ to stop driving device 40 operations. When interrupting control circuit 30 receives high voltage level data detecting signal $S_3$, interrupting control circuit 30 does not output shutdown signal $S_5$ to driving device 40.

Figure 3:
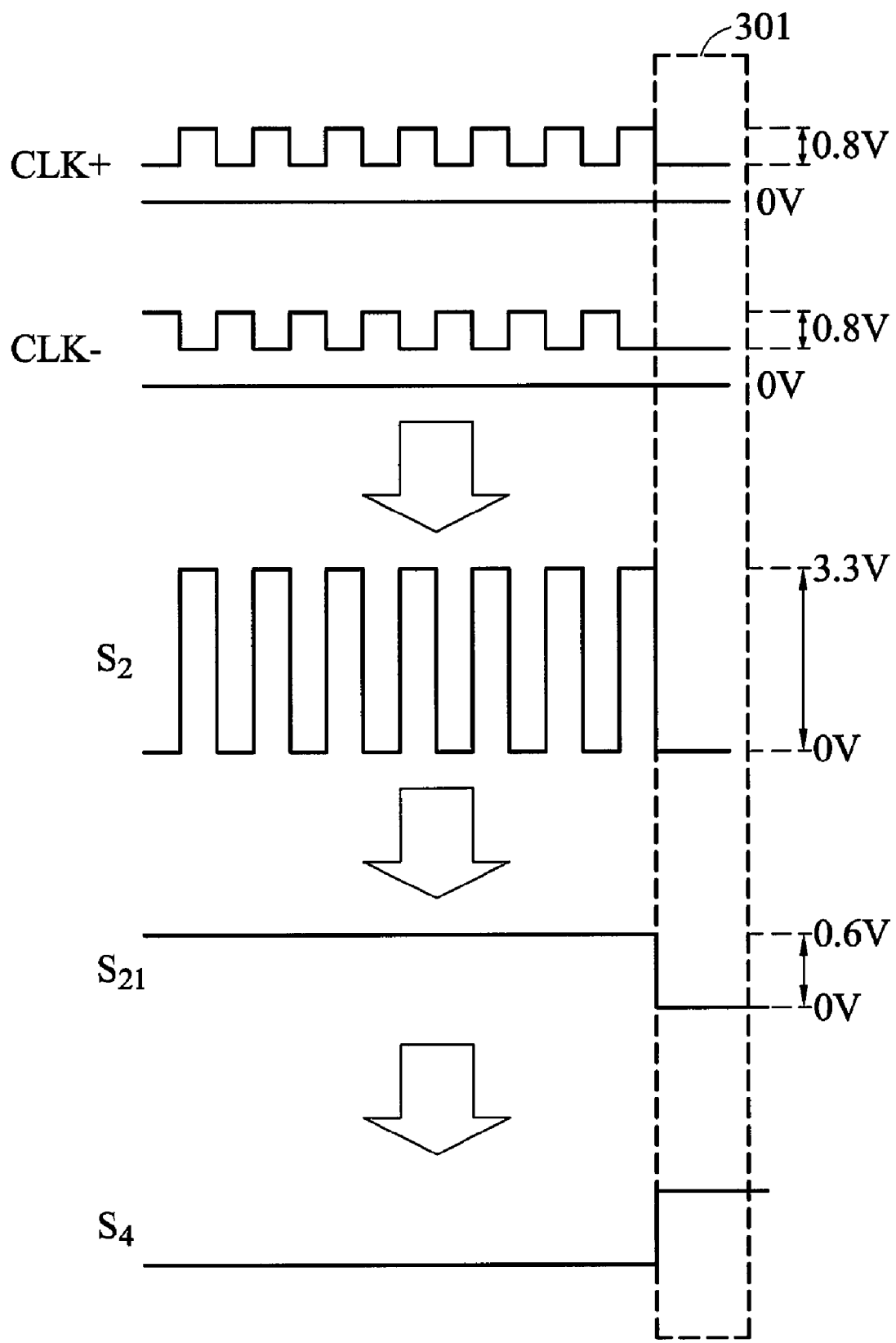
FIG. 3 is a signal diagram of a clock signal detector according to another embodiment of the invention.

Rectification filter circuit 22 can be a stand-alone rectification component or inductor L1 as shown in FIG. 2. Inductor 11 converts single clock signal $S_2$ into DC signal $S_{21}$ as shown in FIG. 3. Inverter 23 comprises resistor $R_3$ and NPN BJT (Bipolar Junction Transistor) $Q_3$. Inverter 23 inverts DC signal $S_{21}$ into clock detecting signal $S_4$. If the single clock signal $S_2$ is abnormal, at low voltage level for a long period of time or disappears (abnormal state 301), DC signal $S_{21}$ is at low voltage level and clock detecting signal $S_4$ is at high voltage level as shown in FIG. 3. When interrupting control circuit 30 receives high voltage level clock detecting signal $S_4$, interrupting control circuit 30 outputs shutdown signal $S_5$ to stop driving device 40 operations. When interrupting control circuit 30 receives the low voltage level clock detecting signal $S_4$, interrupting control circuit 30 does not output shutdown signal $S_5$ to driving device 40.

FIG. 3 is a signal diagram of clock signal detector 20 according to another embodiment of the invention. If differential clock signals CLK+ and CLK− are at low voltage level (abnormal state 301), single clock signal $S_2$ and DC signal $S_{21}$ are at low voltage level, clock detecting signal $S_4$ is at high voltage level and interrupting control circuit 30 outputs shutdown signal $S_5$.

FIG. 4 is a signal diagram of data signal detector 10 according to another embodiment of the invention. If differential data signals DATA+ and DATA− are at high and low voltage level respectively (abnormal state 401), single data signal $S_1$ is at high voltage level, integrating signal $S_{11}$ is higher than threshold voltage $V_t$, detecting signal $S_3$ is at low voltage level and interrupting control circuit 30 outputs shutdown signal $S_5$.

Figure 5:
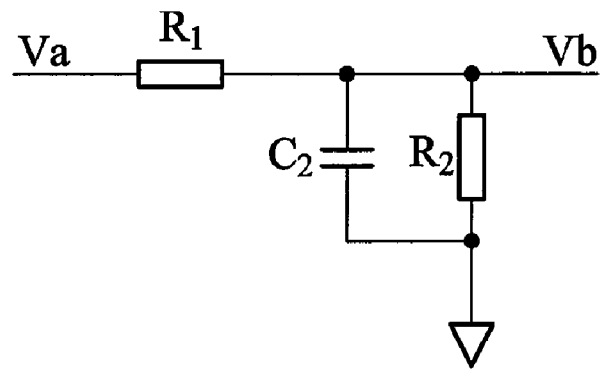
FIG. 5 is an integrating circuit according to another embodiment of the invention.

FIG. 5 is integrating circuit 12 according to another embodiment of the invention. Integrating circuit 12 starts from initial voltage $V_{initial}$ at node n1 as shown in FIG. 4. Voltage Va is based on single data signal $S_1$. With regard to formulas of integrating circuit 12 is as follows:

Voltage Ration $V_R = R_2/(R_1+R_2)$ $RC$ Time Constant $Tc = R_1*R_2*C_2/(R_1+R_2)$ $V_b = V_a*V_R*[1-e^{(-t/Tc)}] + V_{initial}*e^{(-t/Tc)}$ Initial voltage $V_{initial}$ (Definition of initial voltage $V_{initial} = V_R*V_a/2$) is configured based on the assumption of a normal data transmission state. Initial voltage $V_{initial}$ is calculated according to positive and negative parts of a pulse signal. Initial voltage $V_{initial}$ is also a half of threshold voltage $V_t$.

Figure 6:
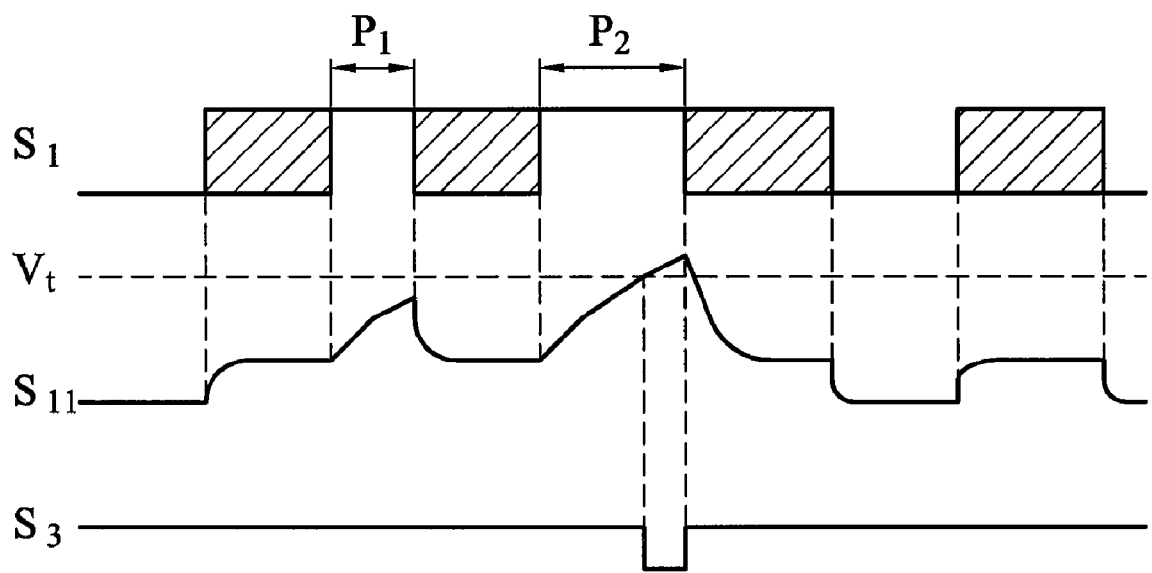
FIG. 6 is a schematic diagram of a data signal detector according to another embodiment of the invention.

FIG. 6 is a schematic diagram of data signal detector 10 according to another embodiment of the invention. During period $P_1$, single data signal $S_1$ is logic 1 (high voltage level) for 200 bits. And during period $P_2$, single data signal $S_1$ is logic 1 (high voltage level) for 800 bits. During period $P_2$, integrating signal $S_{11}$ is increased to more than threshold voltage Vt and data detecting signal $S_3$ becomes low voltage level as shown in FIG. 6 to show that data signals DATA+ and DATA− are abnormal.

In summary, signal detector 50 can detect abnormality in clock or data signal transmission. Signal detector 50 comprises two parts, data signal detector 10 and clock signal detector 20. Data signal detector 10 can detect abnormal differential data signals DATA+ and DATA− which have unacceptable high portions of high/positive voltage level to send shutdown signal $S_5$ to driving device 40 to avoid the laser transmitter to emit abnormal laser signals for power saving and unnecessary breakdowns. Clock signal detector 20 can detect interrupted differential clock signals CLK+ and CLK− to send shutdown signal $S_5$ to driving device 40 to stop the laser transmitter to send abnormal laser signals to avoid time delay and transmission resource waste.

While the invention has been described by way of example and in terms of preferred embodiment, it is to be understood that the invention is not limited to thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A signal detector, comprising
   a signal translator converting differential data signals into a single data signal;
   a data signal detector outputting a data detecting signal according to the single data signal; and
   an interrupting control circuit receiving the data detecting signal and outputting a shutdown signal when the single data signal is at high voltage level over a predefined ratio.

2. The signal detector as claimed in claim 1, wherein the data signal detector comprising:
   an integrating circuit coupled to the signal translator and converting the single data signal into an integrating signal, wherein when the single data signal is at high voltage level over the predefined ratio, the integrating signal is higher than a threshold voltage; and
   a first inverter coupled to the integrating circuit and inverting the integrating signal to output the data detecting signal.

3. The signal detector as claimed in claim 2, wherein the integrating circuit comprises:
   a first resistor coupled between the signal translator and a first node;
   a second resistor coupled between the first node and ground; and
   a capacitor coupled between the first node and ground.

4. The signal detector as claimed in claim 3, wherein the integrating circuit comprises an initial voltage at the first node and the initial voltage is a half of the threshold voltage.

5. The signal detector as claimed in claim 1, wherein the signal translator further converts differential clock signals into a single clock signal.

6. The signal detector as claimed in claim 5, further comprising:
   a clock signal detector outputting a clock detecting signal according to the single clock signal;

wherein the interrupting control circuit receives the clock detecting signal and outputs the shutdown signal when the single clock signal abnormally disappears.

7. The signal detector as claimed in claim 6, wherein the clock signal detector comprises:
   a rectification filter circuit coupled to the signal translator, converting the single clock signal into a DC signal; and
   a second inverter coupled to the rectification filter circuit and inverting the DC signal into the clock detecting signal.

8. The signal detector as claimed in claim 7, wherein the rectification filter circuit is a micro inductor to receive the single clock signal to output the clock detecting signal.

9. The signal detector as claimed in claim 1, wherein the interrupting control circuit comprises:
   a NPN BJT transistor comprising a base receiving the clock detecting signal, a collector coupled to ground and a emitter;
   a PMOS transistor comprising a gate coupled to the emitter of the NPN BJT transistor and a first inverter, a source coupled to a first DC voltage and a drain outputting the shutdown signal according to data detecting signal and the clock detecting signal.

10. The signal detector as claimed in claim 1, wherein the signal translator is a LVPECL to LVTTL translator.

11. A signal detector, comprising
   a signal translator respectively converting differential data signals and differential clock signal into a single data signal and a single clock signal;
   a data signal detector outputting a data detecting signal according to the single data signal;
   a clock signal detector outputting a clock detecting signal according to the single clock signal;
   an interrupting control circuit receiving the data detecting signal and outputting a shutdown signal when the single data signal is at high voltage level over a predefined ratio and receiving the clock detecting signal and outputting the shutdown signal when the single clock signal abnormally disappears.

12. The signal detector as claimed in claim 11, wherein the data signal detector comprising:
   an integrating circuit coupled to the signal translator and converting the single data signal into an integrating signal, wherein when the single data signal is at high voltage level over the predefined ratio, the integrating signal is higher than a threshold voltage; and
   a first inverter coupled to the integrating circuit and inverting the integrating signal to output the data detecting signal.

13. The signal detector as claimed in claim 12, wherein the integrating circuit comprises:
   a first resistor coupled between the signal translator and a first node;
   a second resistor coupled between the first node and ground; and
   a capacitor coupled between the first node and ground.

14. The signal detector as claimed in claim 11, wherein the clock signal detector comprises:
   a rectification filter circuit coupled to the signal translator, converting the single clock signal into a DC signal; and
   a second inverter coupled to the rectification filter circuit and inverting the DC signal into the clock detecting signal.

15. The signal detector as claimed in claim 14, wherein the rectification filter circuit is a micro inductor to receive the single clock signal to output the clock detecting signal.

16. The signal detector as claimed in claim 11, wherein the interrupting control circuit comprises:
   a NPN BJT transistor comprising a base receiving the clock detecting signal, a collector coupled to ground and a emitter;
   a PMOS transistor comprising a gate coupled to the emitter of the NPN BJT transistor and a first inverter, a source coupled to a first DC voltage and a drain outputting the shutdown signal according to the data detecting signal and the clock detecting signal.

17. The signal detector as claimed in claim 11, wherein the signal translator is a LVPECL to LVTTL translator.

* * * * *